Dec. 12, 1967   R. E. SPANGENBERG   3,357,270
DRIVING UNIT FOR THE TILT ROD OF A VENETIAN BLIND
Filed June 21, 1965

INVENTOR
Robbert E. Spangenberg
BY
ATTORNEYS

United States Patent Office 3,357,270
Patented Dec. 12, 1967

3,357,270
DRIVING UNIT FOR THE TILT ROD OF A VENETIAN BLIND
Robbert Ernst Spangenberg, Spijkenisse, Netherlands, assignor to Hunter Douglas International Ltd., Montreal, Quebec, Canada, a corporation of Canada
Filed June 21, 1965, Ser. No. 465,689
Claims priority, application Netherlands, June 23, 1964, 64—7,121
6 Claims. (Cl. 74—89.22)

ABSTRACT OF THE DISCLOSURE

A driving mechanism for the tilt rod of a Venetian blind, said rod being driven by a cord wound around a pulley whereby pulling on either end of the cord by a person results in rotation of the pulley and corresponding tilting of the tilt rod, said pulley being provided with recesses extending in an axial direction and through one flange thereof whereby the middle portion of the cord can be fixedly attached to the pulley and wound around the hub thereof without having to reeve or thread one end of the cord a plurality of times around the pulley.

---

This invention relates to a driving unit for the tilt rod of a Venetian blind, comprising a shaft adapted to be driven by a control cord which is coupled to the tilt rod by means of transmission gear, a pulley for the control cord mounted on one end of the shaft to be driven and a guiding element for the control cord mounted at the circumference of the pulley. With this well known driving unit for the tilt rod of a Venetian blind, the provision and fixing of the control cord present difficulties resulting in loss of time, since the components for the Venetian blind are fully assembled by hand, it is necessary to minimise such operations.

The invention consists in a driving unit for the tilt rod of a Venetian blind as described above in which the cylindrical surface of the pulley is provided with two recesses of different dimension, as viewed in axial direction of the pulley and extending through one upright flange of the pulley said recesses being mutually separated in the circumferential direction.

To create sufficient room for the parts of the control cord which are wound up or unwound from the pulley the dimension of one recess substantially corresponds with the diameter of the control cord, and the dimension in the axial direction of the second recess is a multiple of the first recess. To allow for the easy provision and fixing of the control cord it is advantageous that the second recess has a local narrowing to lock the control cord in its end position. Because the end of the first recess is positioned at the location of one of the flanges of the pulley and the end of the second recess near the opposite pulley flange, a rapid winding and unwinding of the relative parts of the control cord is assured. To obtain a construction as compact as possible and at the same time to ensure a heavy design a circular recess is formed between the hub of the pulley and its cylindrical surface, which recess is open on one side of one of the pulley flanges and closed or substantially closed on the other pulley flange side. If the hub is also provided with a radially projecting portion or cam in between the abovementioned recesses, an excellent fixing of the control cord to the pulley is obtained immediately after location of the cord.

Figure 1:
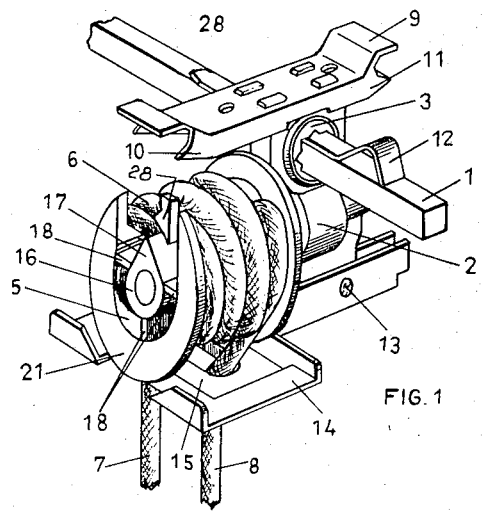
Figure 2:
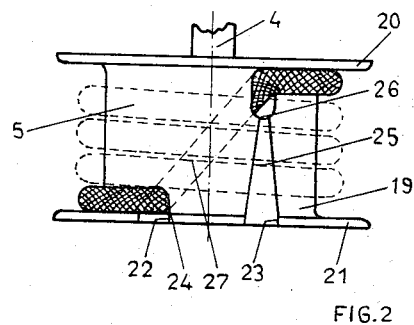

The invention will be further described, by way of example, with reference to the accompanying drawings, in which FIGURE 1 shows in a perspective view the driving unit for the tilt rod of a Venetian blind, provided with a control cord hanging down in two parts;

FIGURE 2 shows a top plan view of the pulley for the driving unit illustrated in FIGURE 1.

The driving unit for the tilt rod 1 of a Venetian blind comprises a worm gear located in a housing 2, the worm wheel 3 of which has been coupled to the tilt rod 1. On an extension of the worm shaft 4 a pulley 5 is located with a control cord 6 wrapped around it, the two ends 7 and 8 of which hang downwards. The top of the housing 2 for the driving unit is provided with a connecting piece 9 of which the hook-shaped parts 10 and 11 protruding at each end are adapted to fit under the beads of the rail of a Venetian blind (not illustrated). A locking spring 12 ensures that the tilt rod 1 is held in place in the centre bore of the worm wheel 3.

A guiding element 14 formed with a slotted hole 15 to guide through the control cord 6, hinging on a hinge shaft 13, is located under the pulley 5 and ensures that the control cord 6 is correctly guided on the pulley, regardless of the possible change in direction of the cord ends 7 and 8, resulting from an angle of control which is different from that shown in FIGURE 1.

The hub 16 of the pulley 5 is provided with an axial cam 17 and is connected with the surface 19 by means of reinforcing ribs 18. The side flanges 20 and 21 of the pulley sufficiently protrude in a radial direction to prevent the cord 6 from slipping off the pulley. The flange 21 is pierced at the two locations 22 and 23 which connect with recesses 24 and 25 respectively in the surface of the pulley 5. The depth in the axial direction of the recess 24 corresponds with the thickness of the control cord 6, whereas the depth of the recess 25 is a multiple of that of the recess 24, its end being located close to the flange 20. To prevent displacement of the control cord 6 in the recess 25, the shape of this recess 25 is such that it has a narrowing 26 in front of the opening in which the cord is placed near the side flange 20. Because the surface of the pulley 5 is partly cylindrical and of thin material, the control cord 6 can be easily pulled through the narrowing 26; the whole pulley can for example be made of a resilient synthetic plastics material. Positioning the control cord on the pulley is carried out as follows: the cord is first placed into the recess 24 as shown in FIGURE 2, then slid between the radially raised edge or cam 17 and the remaining part of the surface with flanged part 28, resulting in the cord being clamped. In FIG. 1 this part is for clearness' sake partly broken away. After the right-hand part of the cord in FIGURE 2 has been slid through the narrowing 26, the cord is thus fixed on the pulley at the correct locations and according to the oblique connection 27. This can be effected for example with the guiding element 14 pivoted downwards and after the required number of turn to tilt the tilt rod have been wrapped on the pulley, the ends 7 and 8 of the cord, or if an endless cord is used the cord loop, can be guided through the opening 15, after which the guiding element 14 is pivoted back under the pulley. The fixing of the control cord on the pulley is extremely simple and efficient, it requires no special tool and may be carried out quickly.

I claim:
1. A driving mechanism for the tilt rod of a Venetian blind, comprising a driving shaft actuated by means of a control cord, which by means of a transmission gear is coupled with the tilt rod and on one end of which a pulley provided with side flanges is mounted, the cord portions depending from the pulley being guided through a guide, one of the side flanges comprising two recesses spaced apart in circumferential direction, each of said recesses adjoining one of two recesses for the control cord provided in the cylindrical part of the pulley, said last mentioned recesses extending axially of the hub of the pulley and having different axial lengths.

2. A driving mechanism according to claim 1, characterized in that one of the recesses provided in the hub of the pulley has a length which substantially corresponds with the diameter of the control cord, and in that the length of the other of said recesses provided in said hub amounts to a multiple of the length of the first recess.

3. A driving mechanism according to claim 1, characterized in that one of the recesses provided in the hub of the pulley has a length which substantially corresponds with the diameter of the control cord, and in that the other of said recesses provided in said hub extends substantially up to the other flange of said pulley.

4. A driving mechanism according to claim 1, characterized in that one of the recesses provided in the hub of the pulley has a length which substantially corresponds with the diameter of the control cord and in that the other of said recesses provided in said hub has at a distance from its end substantially corresponding with the diameter of the control cord locally a narrowing for locking said control cord in said recess.

5. A driving mechanism according to claim 1, characterized in that the hub of the pulley is provided with a hub portion and a cylindrical portion surrounding said hub portion and being connected by means of ribs with said hub portion, the recesses being arranged in said cylindrical hub portion and said ribs being arranged in such a way that there is no rib between the recesses.

6. A driving mechanism according to claim 1, characterized in that one of the recesses provided in the hub of the pulley has a length which substantially corresponds with the diameter of the control cord and in that the other of said recesses provided in said hub has at a distance from its end substantially corresponding with the diameter of the control cord locally a narrowing for locking said control cord in said recess, the hub portion comprising a cam provided below the part of the cylindrical portion of the hub located between the recesses.

References Cited

UNITED STATES PATENTS 2,855,991  10/1958  Loucony _____ 160—177

FOREIGN PATENTS 255,438  11/1964  Australia.
301,964  12/1963  Netherlands.

FRED C. MATTERN, Jr., *Primary Examiner.*

W. S. RATLIFF, *Assistant Examiner.*